United States Patent [19]

Isobe

[11] Patent Number: 4,485,999
[45] Date of Patent: Dec. 4, 1984

[54] ANTI VIBRATION MOUNTING WITH REINFORCED BRACKET

[75] Inventor: Masahiro Isobe, Toyota, Japan

[73] Assignee: Toyota Jidosha Kabushiki Kaisha, Toyota, Japan

[21] Appl. No.: 472,184

[22] Filed: Mar. 4, 1983

[30] Foreign Application Priority Data

Jun. 10, 1982 [JP] Japan ............................ 57-86947[U]

[51] Int. Cl.³ .............................................. F16F 1/38
[52] U.S. Cl. ................................ 248/659; 267/63 A; 267/141.2; 267/153; 403/225
[58] Field of Search ............... 267/63 R, 63 A, 141.2, 267/141.3, 141.4, 141.5, 141.6, 141.7, 153; 248/635, 659; 403/203, 225, 226, 227, 228; 180/300; 296/35.2

[56] References Cited

U.S. PATENT DOCUMENTS

| 2,207,059 | 7/1940 | Herring | 403/226 X |
| 2,925,972 | 2/1960 | Sullivan | 248/659 X |
| 3,863,871 | 2/1975 | Meisenheimer, Jr. | 267/153 X |

Primary Examiner—Bruce H. Stoner, Jr.
Assistant Examiner—R. R. Diefendorf
Attorney, Agent, or Firm—Kenyon & Kenyon

[57] ABSTRACT

Coaxial inner and outer tubular members are mutually supported by a resilient tubular elastic intermediate member mounted between them. A main plate is formed with a fixing portion substantially corresponding in shape to a first fixing portion of the outer member and fixed thereto and with a protruding portion extending outwards, and extends parallel to the central axis. A bracing plate is formed with a fixing portion fixed to a second fixing portion of the outer member and with a protruding portion extending outwards, and is also parallel to the central axis. The extreme ends of the protruding portions of the main and bracing plates are fixed together. A planar filler plate extends perpendicularly to the central axis at an axially intermediate position along the main and bracing plates and spans between the tubular outer member and the main and bracing plates with its peripheral edge abutting against axially intermediate portions thereof and with its major portion fixed thereto. A bolt arrangement for fixing the protruding portion of the main plate to an external body is provided.

9 Claims, 4 Drawing Figures

ANTI VIBRATION MOUNTING WITH REINFORCED BRACKET

BACKGROUND OF THE INVENTION

The present invention relates to the field of anti vibration mountings, and more particularly relates to a tubular type anti vibration mounting, which incorporates an improved bracket structure, and which is suitable for mounting an engine in an automotive vehicle and is durable and strong.

There is a known sort of anti vibration mounting which includes coaxial inner and outer tubular members and an elastic member fitted between them so as to mutually support them with respect to one another. Such an anti vibration mounting is typically used for mounting an automotive vehicle engine to the vehicle body or chassis, with one of the tubular members connected to the engine and the other to the body or chassis. Now, with regard to the connection to the tubular inner member, this typically presents no problem, because the member to which said tubular inner member is to be fixed may be passed through its central hole and clamped against the axial ends of said tubular inner member; but the connection to the tubular outer member has typically been performed via a bracket which is fixed, as by welding or the like, to the outer surface of this tubular outer member, and the construction of this bracket, in the prior art, has not been entirely satisfactory, because considerable force and cyclic vibration due to engine operation are imposed on said bracket, and this has tended to cause fatigue and cracking of the bracket and/or the tubular outer member of the mounting. Accordingly, prior art durability has tended to be poor.

To combat these problems, it has been practiced to make the bracket, and the mounting as a whole, large and heavy, so as to withstand such force and cyclic vibration, but this has entailed increased weight and cost, and moreover has not entirely solved the durability problem.

SUMMARY OF THE INVENTION

Accordingly, it is the primary object of the present invention to provide an anti vibration mounting, which has a mechanically sophisticated structure, so that its strength and rigidity are increased without increasing its weight.

It is a further object of the present invention to provide such an anti vibration mounting, the cross section of the bracket structure of which has a large second moment and is accordingly strong and rigid.

It is a further object of the present invention to provide such an anti vibration mounting, the cross section of the bracket structure of which has an "H" shape.

It is a further object of the present invention to provide such an anti vibration mounting, which is low in cost.

It is a further object of the present invention to provide such an anti vibration mounting, which has good durability.

It is a further object of the present invention to provide such an anti vibration mounting, which withstands high load well.

It is a further object of the present invention to provide such an anti vibration mounting, which withstands cyclic vibration well.

It is a further object of the present invention to provide such an anti vibration mounting, which is not prone to cracking during use.

It is a further object of the present invention to provide such an anti vibration mounting, which is simple to manufacture.

According to the most general aspect of the present invention, these and other objects are accomplished by an anti vibration mounting, comprising: (a) a tubular inner member which has a central axis; (b) a tubular outer member fitted coaxially around the outside of said tubular inner member, comprising a first fixing portion and a second fixing portion which are at approximately the same axial position along said tubular outer member and are spaced apart substantially in the circumferential direction thereof; (c) a resilient tubular elastic intermediate member mounted coaxially between said tubular inner member and said tubular outer member so as to support them mutually with respect to one another; (d) a main bracket plate formed with a fixing portion substantially corresponding in shape to said first fixing portion of said tubular outer member and fixed thereto and with a protruding portion which extends outwards from said tubular outer member; said main bracket plate extending substantially parallel to said central axis; (e) a bracing bracket plate formed with a fixing portion fixed to said second fixing portion of said tubular outer member and with a protruding portion which extends outwards from said tubular outer member; said bracing bracket plate extending substantially parallel to said central axis; and the extreme end of said protruding portion of said bracing bracket plate remote from said outer tubular member being fixed to the extreme end of said protruding portion of said main bracket plate remote from said outer tubular member; (f) a filler bracket plate which is substantially planar and extends in a plane substantially perpendicular to said central axis at an intermediate axial position between the axially extreme portions of said main and bracing bracket plates; said filler bracket plate spanning a space defined between said tubular outer member and said main and bracing bracket plates and substantially intercepting said space with substantially all parts of its peripheral edge abutting against axially intermediate portions of said main and bracing bracket plates and said tubular outer member; and the major portion of said periphery of said filler bracket plate being fixed to said abutting axially intermediate portions of said main and bracing bracket plates and of said tubular outer member; and (g) means for fixing said protruding portion of said main bracket plate to an external body.

According to such a structure, because the main bracket plate is secured to the outer tubular member at a portion thereof which is substantially spaced in the circumferential direction from the portion to which the bracing bracket plate is fixed, and because the filler bracket plate spans between the outer tubular member and the main and bracing bracket plates at an intermediate axial position therealong, the section of the construction is shaped as a letter "H" and the second moment thereof is large. Because the external body is fixed to the main bracket plate, which is fixed to the outer tubular member by the fixing portion of the main bracket plate which is conformed in shape to said outer tubular member, said fixed accordingly being strong, the effectiveness of the construction is guaranteed. Accordingly, the bracket structure, in combination with the tubular outer member, has great connecting strength and rigidity. Thus, according to the shown sophisticated construction for the bracket structure, the mounting as a whole is light and cheap and yet exceptionally strong, rigid, and durable.

Further, according to a more particular aspect of the present invention, these and other objects are more particularly and concretely accomplished by an anti vibration mounting as described above, wherein said fixing portion of said bracing bracket plate substantially corresponds in shape to said second fixing portion of said tubular outer member.

According to such a structure, the fixing of this fixing portion of the bracing bracket plate to the second fixing portion of the tubular outer member may be particularly strong and effective.

Further, according to another more particular aspect of the present invention, these and other objects are more particularly and concretely accomplished by an anti vibration mounting as first described above, wherein said protruding portion of said main bracket plate is substantially planar.

According to such a structure, the rigidity of this protruding portion of the main bracket plate is kept optimum, and the strength and durability and mountability of the construction as a whole are enhanced.

Further, according to a yet more particular aspect of the present invention, these and other objects are more particularly and concretely accomplished by an anti vibration mounting of the sort first described above, wherein said fixing means comprises first and second fixing means which are located on opposite sides of said filler bracket plate.

According to such a structure, the imposed load on the mounting is well distributed with respect to the "H" shaped cross section of the structure, and accordingly durability and particularly resistance against premature cracking are advantageously promoted.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENT

Figure 1:
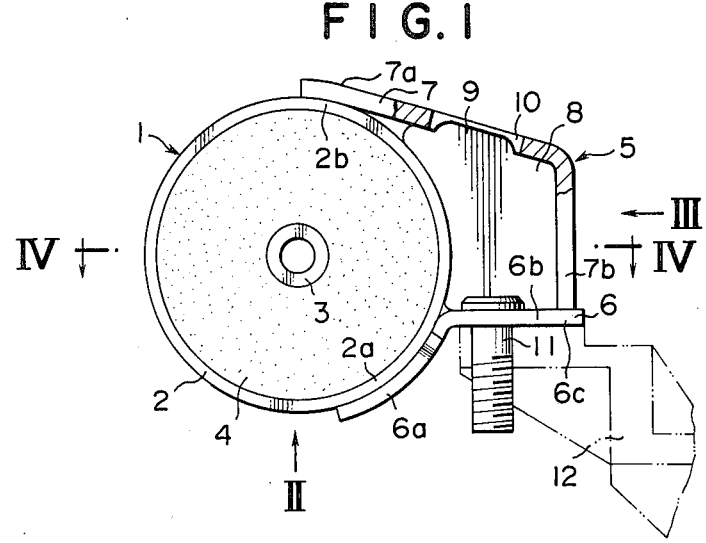
FIG. 1 is a part sectional part perspective view taken through the preferred embodiment of the anti vibration mounting according to the present invention along a plane perpendicular to its central axial line, also showing an engine bracket attached thereto by double dotted lines.

The present invention will now be described with reference to its preferred embodiment, and with reference to the appended drawings. In FIG. 1, the reference numeral 1 generally denotes a tubular anti vibration mounting according to the present invention. This anti vibration mounting 1 comprises an outer tubular member 2, an inner tubular rod like member 3 which is coaxial with the outer tubular member 2, a tubular elastic intermediate member 4 made of rubber or the like which is disposed in the space radially between the outer and inner tubular members 2 and 3 and is coupled to them both and thus mutually elastically supports them with respect to one another, and a bracket structure 5 fixed to the outside surface of the outer tubular member 2.

The anti vibration mounting 1 is used as follows. A first body, not shown in the figures, is passed through the central hole of the tubular inner member 3, and is secured thereto, as for example by nuts which are screwed on said first body so as to clamp said tubular inner member in the axial direction. For example, this first body may be a part of the body or chassis structure of an automotive vehicle. A second body, which may be an engine of an automotive vehicle or a bracket fixed thereto as exemplarily shown in FIG. 1 by double dotted lines and denoted therein by the reference numeral 12, is secured to said bracket structure 5 fixed to the outside surface of the outer tubular member 2 by bolts 11 which will be more particularly described hereinafter. Accordingly, by the resilient mounting action of said tubular elastic intermediate member 4, said first body and said second body are mutually fixed in position with regard to one another with a certain degree of resilience therebetween; i.e., in the cited example, said automotive vehicle engine is resiliently mounted to said chassis or body.

Figure 2:
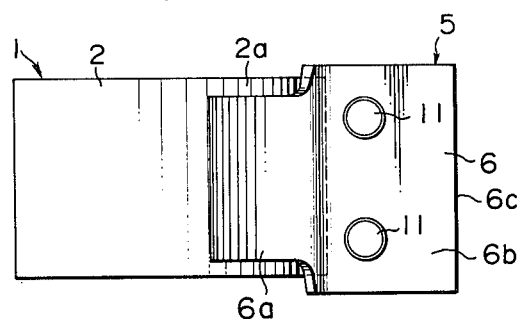
FIG. 2 is a side view of the anti vibration mounting of FIG. 1 as seen in the direction shown by the arrow II in FIG. 1.

The details of the bracket structure 5 are as follows. A main plate 6, best seen in FIG. 2, is formed with a generally part cylindrical fixing portion or tab 6a and with a flat plate shaped screw receiving portion 6b protruding from said fixing portion 6a at a considerable angle (almost but not quite radially) outwards, the extreme end of this screw receiving portion 6b being denoted by 6c. The fixing portion 6a of this main plate 6 is securely attached to a fixing portion 2a of the outer cylindrical surface of the outer tubular member 2, to the shape of which it closely conforms, by welding or the like. Since the area and the peripheral extent of the fixing portion 6a and of the fixing portion 2a are quite considerable, this welded join is extremely strong and rigid. Thus, the configuration is that the main plate 6 (although not planar) extends parallel to the central axis of the outer and inner members 2 and 3. The protruding screw receiving portion 6b of the main plate 6 is pierced with two screw holes, through which are passed two screws 11 for, as mentioned above, fixing the bracket structure 5 to a body which is to be supported or to provide support.

Further, the bracket structure 5 also comprises a bracing plate 7, which is formed generally as an "L" shape with an angle which is somewhat greater than a right angle, i.e. slightly obtuse. One end 7a of this bracing plate 7 is connected to another fixing portion 2b of the outer cylindrical surface of the outer tubular member 2 by welding or the like. In the shown preferred embodiment, this end 7a of the bracing plate 7 is slightly curved so as to closely conform to the shape of the fixing portion 2b, but since the circumferential extent of the fixing portion 2b for the bracing plate 7 is much less than the circumferential extent of the fixing portion 2a for the main plate 6, which is because the strength of the fixing of the bracing plate 7 to the outer tubular member 2 is not required to be as great as the strength of the fixing of the main plate 6, this curving of the end 7a is not actually essential to the present invention. Thus, again, the configuration is that the bracing plate 7 (although not planar) extends parallel to the central axis of the outer and inner members 2 and 3. The fixing portion 2a of the outer tubular member 2 for the main plate 6 and the fixing portion 2b for the bracing plate 7 are spaced apart by almost 180° around the circumference of said outer tubular member 2.

Figure 3:
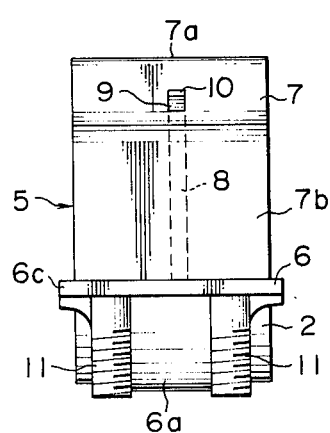
FIG. 3 is another side view of the anti vibration mounting, of FIGS. 1 and 2, particularly showing a bracket structure incorporated therein, as seen in the direction shown by the arrow III in FIG. 1.
Figure 4:
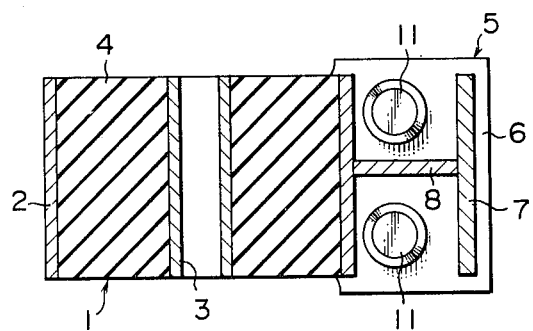
FIG. 4 is a sectional view through the anti vibration mounting of FIGS. 1-3, taken along a plane shown by the arrows IV—IV in FIG. 1.

The end 7b of the bracing plate 7 remote from the outer tubular member 2 is secured to the end 6c of the main plate 6 remote from the outer tubular member 2 by welding or the like. Thus, a space is defined (as seen in the axial direction as in FIG. 1) between the outer cylindrical surface of the tubular member 2 and the inner sides of the main plate 6 and the bracing plate 7. Across this space there is fitted a filler plate 8, which extends in a plane perpendicular to the central axis of the outer and inner tubular members 2 and 3 which is axially positioned at approximately midway between the axial ends of the main and bracing plates 6 and 7. Accordingly, as seen in FIG. 4, the section of this construction taken in the shown plane is approximately that of a letter "H". The edges of the filler plate 8 are fixed by welding or the like to the axially intermediate parts of the inner surfaces of the main and bracing plates 6 and 7 against which they abut, and further a projecting tab 9 formed on the part of the filler plate 8 which confronts the part of the bracing plate 7 which extends substantially radially outwards from the fixing portion 7a thereof is fitted into a slot 10 cut in said bracing plate 7 to correspond thereto; this construction is provided for convenience of preliminary fixing before performing the welding work for the filler plate 8. The view of the bracing plate 7 shown in FIG. 3 best shows this slot 10.

During use of this anti vibration mounting 1, the fact that the main plate 6 is secured to the outer tubular member 2 by the relatively large mounting portion 6a, the fact that the portions 2a and 2b of the outer tubular member 2 to which the main and bracing plates 6 and 7 are fixed are spaced apart around the central axis of the construction by a considerable peripheral distance, and the fact that the filler plate 8 is provided as spanning between the outer tubular member 2 and the main and bracing plates 6 and 7 at an intermediate axial position relative to said main and bracing plates 6 and 7 so that the section of the construction as seen in FIG. 4 is like a letter "H" and the second moment thereof is large, all contribute to great connecting strength and rigidity of the construction as a whole, and accordingly the mounting as a whole has a sophisticated mechanical structure which is very resistant against heavy load force and also against cyclic vibration. Accordingly cracking and premature fatigue of the mounting are rendered very unlikely. These good effects have been obtained without requiring the mounting to be large, bulky, or heavy, and accordingly its cost is not high and its manufacture is easy.

A notable good feature of the shown preferred embodiment is that the portion of the main bracket plate 6 protruding from the tubular outer member 2 is straight and planar; this improves strength and rigidity as well as mountability considerably. Another important feature is that the means for fixing this protruding portion of the main bracket plate 6 to an external body, i.e. the bolts 11, is provided as two separate fixing means on opposite sides of the filler plate 8. This properly distributes the applied load over the "H" shaped cross section of the mounting, and is very important for the durability of the construction as a whole. However, these features are not to be considered as limitative of the present invention, but are only additional features of the shown preferred embodiment.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by patent, should be defined not by any of the perhaps purely fortuitous details of the shown embodiment, or of the drawings, but solely by the scope of the appended claims, which follow.

What is claimed is:

1. An anti vibration mounting, comprising:
    (a) a tubular inner member which has a central axis;
    (b) a tubular outer member fitted coaxially around the outside of said tubular inner member, comprising a first fixing portion and a second fixing portion which are at approximately the same axial position along said tubular outer member and are spaced apart substantially in the circumferential direction thereof;
    (c) a resilient tubular elastic intermediate member mounted coaxially between said tubular inner member and said tubular outer member so as to support them mutually with respect to one another;
    (d) a main bracket plate formed with a fixing portion substantially corresponding in shape to said first fixing portion of said tubular outer member and fixed thereto and with a protruding portion which extends outwards from said tubular outer member; said main bracket plate extending substantially parallel to said central axis;
    (e) a bracing bracket plate formed with a fixing portion fixed to said second fixing portion of said tubular outer member and with a protruding portion which extends outwards from said tubular outer member; said bracing bracket plate extending substantially parallel to said central axis; and the extreme end of said protruding portion of said bracing bracket plate remote from said outer tubular member being fixed to the extreme end of said protruding portion of said main bracket plate remote from said outer tubular member;
    (f) a filler bracket plate which is substantially planar and extends in a plane substantially perpendicular to said central axis at an intermediate axial position between the axially extreme portions of said main and bracing bracket plates; said filler bracket plate spanning a space defined between said tubular outer member and said main and bracing bracket plates and substantially intercepting said space with substantially all parts of its peripheral edge abutting against axially intermediate portions of said main and bracing bracket plates and said tubular outer member; and the major portion of said periphery of said filler bracket plate being fixed to said abutting axially intermediate portions of said main and bracing bracket plates and of said tubular outer member;

and (g) means for fixing said protruding portion of said main bracket plate to an external body.

2. An anti vibration mounting according to claim 1, wherein said fixing portion of said bracing bracket plate substantially corresponds in shape to said second fixing portion of said tubular outer member.

3. An anti vibration mounting according to claim 1, wherein said protruding portion of said main bracket plate is substantially planar.

4. An anti vibration mounting according to claim 1, wherein said protruding portion of said bracing bracket plate is substantially angled at an intermediate portion thereof.

5. An anti vibration mounting according to claim 1, wherein a portion of the outer periphery of said filler bracket plate is formed as a tab which is inserted into a slot formed in said protruding portion of said bracing bracket plate.

6. An anti vibration mounting according to claim 5, wherein said protruding portion of said bracing bracket plate is substantially angled at an intermediate portion thereof.

7. An anti vibration mounting according to claim 6, wherein said slot is formed in the portion of said protruding portion of said bracing bracket plate which is between said angled portion thereof and said fixing portion of said bracing bracket plate.

8. An anti vibration mounting according to claim 1, wherein said fixing means comprises first and second fixing means which are located on opposite sides of said filler bracket plate.

9. An anti vibration mounting according to claim 8, wherein said first and second fixing means both comprise bolts passed through holes formed in said protruding portion of said main bracket plate.

* * * * *